United States Patent [19]

Tsinberg

[11] Patent Number: 5,006,926
[45] Date of Patent: Apr. 9, 1991

[54] HIGH DEFINITION MULTIPLE ANALOG COMPONENT AMPLITUDE MODULATED TELEVISION TRANSMISSION SYSTEM

[75] Inventor: Mikhail Tsinberg, Riverdale, N.Y.

[73] Assignee: North American Philips Corporation, New York, N.Y.

[21] Appl. No.: 252,954

[22] Filed: Oct. 3, 1988

[51] Int. Cl.$^5$ .................. H04N 11/00; H04N 11/02; H04N 11/14

[52] U.S. Cl. .................................................... 358/12

[58] Field of Search ........................................ 358/12

[56] References Cited

U.S. PATENT DOCUMENTS

| | | | |
|---|---|---|---|
| 2,884,480 | 4/1959 | Pritchard et al. | 358/23 |
| 2,898,397 | 8/1959 | Richman | 358/16 |
| 3,591,707 | 7/1971 | Abbott | 358/23 |
| 4,473,837 | 9/1984 | Tiemann | 358/12 |
| 4,521,803 | 6/1985 | Gittinger | 358/12 |

FOREIGN PATENT DOCUMENTS

| | | | |
|---|---|---|---|
| 225786 | 12/1983 | Japan | 358/12 |
| 134692 | 7/1985 | Japan | 358/12 |
| 208191 | 10/1985 | Japan | 358/12 |
| 858304 | 1/1961 | United Kingdom | 358/16 |

Primary Examiner—John W. Shepperd
Attorney, Agent, or Firm—Michael E. Marion

[57] ABSTRACT

A system for transmitting and receiving a high definition television signal with characteristics which are determined in part at the receiver. The system transmits an AM signal formed by frequency multiplexing a number of components derived using an HDMAC-60 encoder.

16 Claims, 3 Drawing Sheets

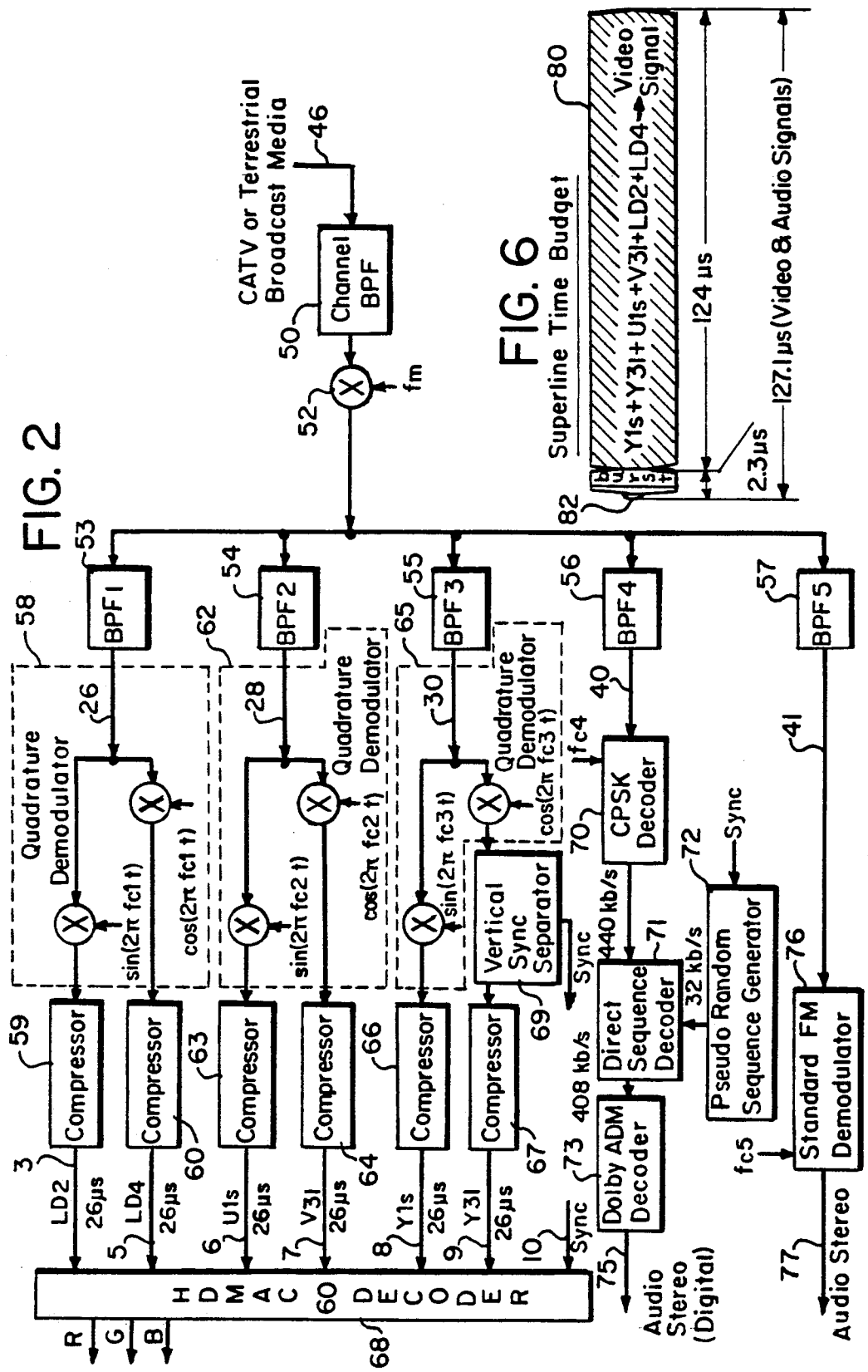

HIGH DEFINITION MULTIPLE ANALOG COMPONENT AMPLITUDE MODULATED TELEVISION TRANSMISSION SYSTEM

Cross reference to related patents and applications:
(1) U.S. Pat. No. 4,694,338;
(2) U.S. application Ser. No. 931,756, filed Nov. 17, 1986; and
3) U.S. application Ser. No. 077,557, all which are incorporated by reference herein.

FIELD OF THE INVENTION

The instant invention relates to the transmission of a high definition television signal in a multiplex analog component (MAC) format.

BACKGROUND OF THE INVENTION

The bandwidth of a television signal is a function of the spatial (horizontal, vertical) and temporal resolution to be contained therein. As increased resolution is desired in either the vertical, horizontal or temporal directions the bandwidth of the signal must be increased. HDTV signals contain considerably more resolution than, for example, standard NTSC encoded signals. As a result various ways have been proposed to generate and transmit HDTV signals, some of which are compatible to a greater or lesser degree with NTSC receivers and some which are designed to replace the NTSC standard altogether.

In order for an HDTV system to gain wide acceptance, however, the economic reality of a $100 billion investment (in North America alone) in NTSC television receivers, must not be ignored. At the same time the trade off for compatibility must not stifle the potential of a true HDTV system.

DESCRIPTION OF THE PRIOR ART

U.S. application Ser. No. 077,557, filed July 24, 1987 and incorporated by reference herein, describes a method for applying bandwidth reduction techniques to an HDTV signal in order to transmit it over a single channel, for example a satellite or recording channel having a bandwidth limitation of 9.5 MHz. This High Definition Multiplexed Analog Component ("HDMAC-60") signal can be used as a master feeder signal between program origination and program redistribution points ( e.g. terrestrial broadcast stations and CATV headends). It has a video base-bandwidth of 9.5 MHZ. which fits within the capabilities of present-day satellite transponders and can also be transmitted over terrestrial microwave and fiber optic transmission systems. It can also be used as a format for Direct Broadcast Satellite (DBS) service. The HDMAC-60 signal transmission system produces, both spatially and temporally, a balanced distribution of detail that is well suited to the characteristics of the human visual system. It is also designed to be "NTSC friendly" and is based on parameters that permit relatively easy transcoding to NTSC and the High Definition NTSC format (as described in U.S. application Ser. No. 084,968). These parameters are 525 lines, 59.94 MHz. frame rate, 1:1 progressive scanning, and 16:9 image aspect ratio.

As described in the U.S. application Ser. No. 077,557 an HDMAC-60 signal can be formed by separating an RGB signal into six different signal components. These components are time multiplexed on a line having a period which equals two NTSC lines (four sequential lines) in duration (127.11 usec).

U.S. Pat. No. 4,694,338, describes a system for transmitting an HDTV signal using two separate signals, one of which is fully compatible with existing NTSC receiving equipment and the other containing enhancement information which, when combined with the NTSC compatible signal in a special receiver, reassembles the HDTV signal. The source for the HDTV signal can be the HDMAC-60 signal. In a terrestrial broadcasting embodiment, however, two 6 MHZ. channels must be used.

SUMMARY OF THE INVENTION

It is an object of the instant invention to provide a system and method for transmission of an HDTV signal, for example the HDMAC-60 signal, which can be Amplitude Modulated on a single channel while offering flexibility in the receiving means, responsive to, for example, economic considerations and the personal desires of the user.

In a particular embodiment of the invention, the components of an HDMAC-60 signal are frequency multiplexed on to a single 8.6 MHZ. wide spectrum channel on a line of 127.11 usec. (referred to hereinafter as a "superline").

It is a feature of the instant invention that it provides for a choice of receiver options.

It is another feature of the invention that it provides for inexpensive interfacing with standard NTSC receivers.

It is another feature of the invention that double sideband modulation can be utilized rather than vestigial sideband modulation, thereby permitting increased use of quadrature modulation and eliminating the need for Nyquist filtering.

It is still another feature of the invention that it uses time expansion and reduction methods which provide the incidental benefit of minimizing multipath distortion.

It is yet another feature of the invention that it uses six high definition multiplexed analog components (MAC) which are derived as described in U.S. patent application Ser. No. 077,557 including a pair of luminance components, a pair of chrominance components and a pair of line differential components. Each pair is then modulated in quadrature for efficient bandwidth usage and minimized artifacts.

It is a further feature of the instant invention that some of the high frequency components of the HDMAC signal are enhanced and transmitted in a single sideband mode to increase the transmission efficiency of the signal and decrease the signal to noise penalty on those parts of the sidebands which are not delivered in a double sideband manner.

It is a still further feature of the instant invention that sound frequency components are placed between the chrominance and luminance components on the HDMAC signal to protect sound quality against channel band limitation or improper channel selection by input/output filters or channel filters.

DETAILED DESCRIPTION OF THE DRAWINGS

Figure 1:
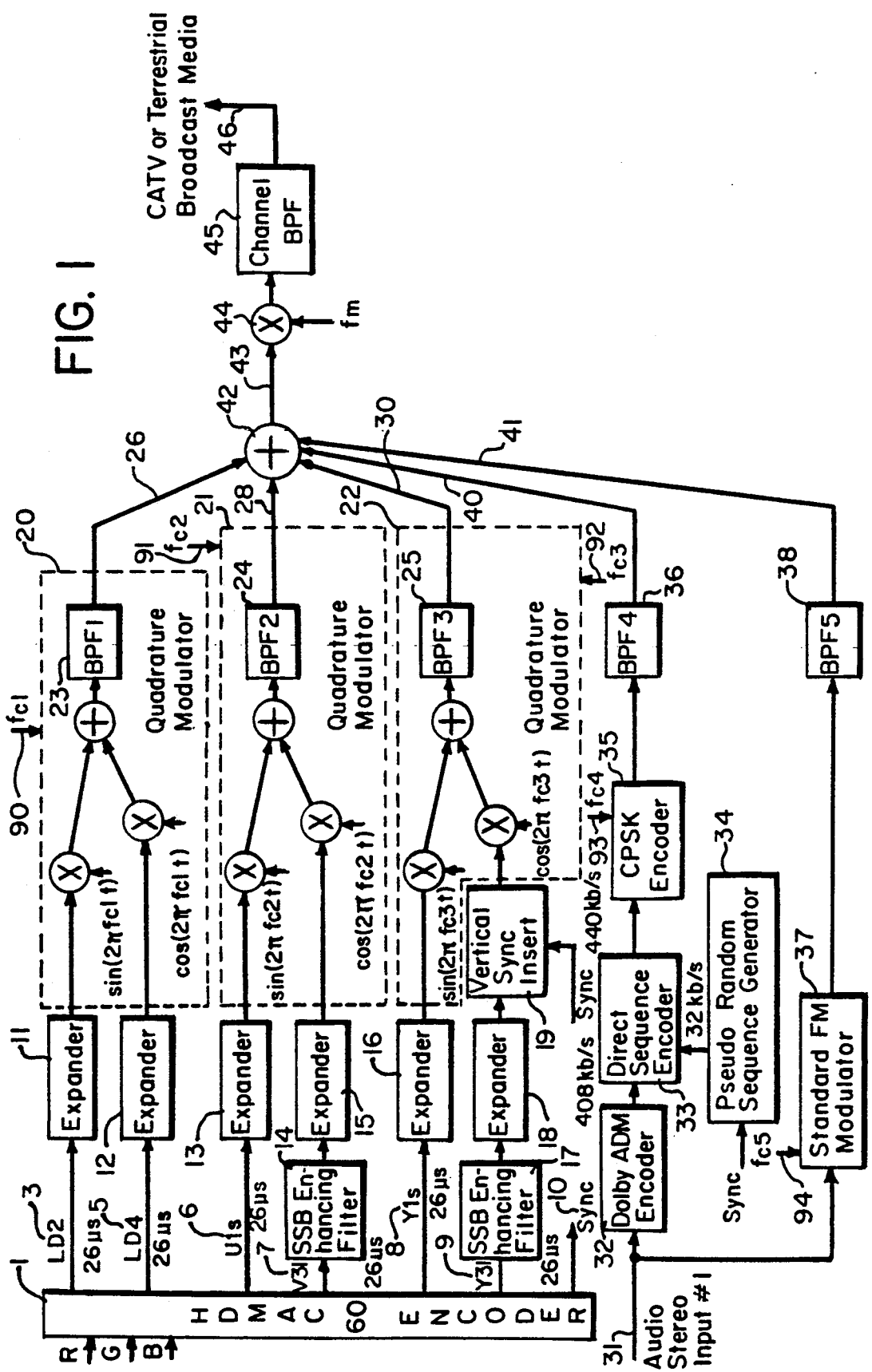

FIG. 1 describes in block diagram form, formation and transmission of an HDMAC-AM signal in accordance with a preferred embodiment of the invention.

FIG. 2 describes in block diagram form, reception of an HDMAC-AM signal in accordance with a preferred embodiment of the invention.

FIG. 3 describes the frequency spectrum of the signal transmitted in accordance with the invention.

FIG. 4 describes the frequency response characteristics of the chrominance SSB enhancing filter.

FIG. 5 describes the frequency response characteristics of the luminance SSB enhancing filter.

FIG. 6 describes the "superline" time budget.

DETAILED DESCRIPTION OF THE INVENTION

U.S. patent application Ser. No. 077,557 describes the use of an HDMAC-60 encoder (shown as 1 on FIG. 1) which separates an RGB signal into six different signal components and an HDMAC-60 decoder (shown as 68 on FIG. 2) for converting these components back into an RGB signal. These components include a pair of line differential signals (LD2 and LD4), a luminance signal with a relatively small bandwidth (Y1S), a luminance signal With a relatively large bandwidth (Y3L), a chrominance difference component with a relatively small bandwidth (U1S), and a chrominance difference component with a relatively large bandwidth (V3L). The HDMAC-60 signal also provides digital sound. The HDMAC-60 encoder and decoder as well as the derivation and explanation of the the six HDMAC-60 components are fully described in the U.S. application Ser. No. 077,057 incorporated by reference herein.

The instant invention describes a system and method for transmitting and receiving an HDTV signal, by deriving the six HDMAC-60 components, as well as a digital sound component and an analog sound component and frequency multiplexing them into a single wide spectrum channel, for example about 8.6 MHz wide, on a "superline" of about 127.11 usec. thereby forming what will hereinafter be referred to as an HDMAC-AM signal.

As described in FIG. 1, HDMAC-60 encoder 1 converts an input RGB signal to a pair of line differential signals (LD2 and LD4), 3 and 5 respectively; a chrominance difference component with a relatively small bandwidth (U1S) 6; a chrominance difference component with a relatively large bandwidth (V3L) 7; a luminance signal with a relatively small bandwidth (Y1S) 8; and a luminance signal with a relatively large bandwidth (Y3L) 9. HDMAC-60 encoder 1 also provides a sync signal 10.

LD2/LD4 line differential signals 3 and 5, which are both for example 26 usec. long and 4.2 MHZ. wide as derived by HDMAC-60 encoder 1, are each time expanded by a factor of, in this example, 24/5 in expander means 11 and 12 respectively. Expander means suitable for use as described herein, are well known in the art (for example FIFO chips which are read/write adjustable in the digital domain, sold by Integrated Device Technology Inc., Santa Clara, Calif.). After expansion, line differential signals 3 and 5 are both for example 124.8 usec. long with 0.88 MHZ. bandwidth.

U1S chrominance component 6 is for example 26 usec. long and 2.1 MHZ. wide as derived by HDMAC-60 encoder 1, and is time expanded by a factor of for example 24/5 by expander means 13 to a length of, in this example 124.8 usec. and a bandwidth of 0.44 MHZ. V3L chrominance component 7, 26 usec. long and 4.2 MHZ. wide as derived by HDMAC-60 encoder 1, is also time expanded by a factor of 24/5 by expander means 15 to a length of, in this example 124.8 usec. and a bandwidth of 0.88 MHZ. after first being processed by SSB enhancing filter 14. Filter 14 can be a linear phase FIR filter having a frequency response as shown in FIG. 4

Y1S luminance component 8, which for example is 26 usec. long and 8.4 MHZ. wide as described by HDMAC-60 encoder 1, is time expanded by a factor for example of 24/5 by expander means 16 to a length of, in this example 124.8 usec. and a bandwidth of 1.75 MHZ. Y3L luminance component 9, which for example is 26 usec. long and 16.8 MHZ. wide as described by HDMAC-60 encoder 1, is also time expanded by a factor of 24/5 by expander means 18 to a length of, in this example 124.8 usec. and a bandwidth of 3.5 MHZ. after first being processed by SSB enhancing filter 17. Filter 17 can be a linear phase FIR filter having a frequency response as shown in FIG. 5. For housekeeping purposes the vertical sync signal 10 provided by HDMAC-60 encoder 1 is inserted onto expanded luminance component 9 by vertical sync insert means 19 during the vertical blanking time. Vertical sync signal 10 can be inserted at −20 IRE. Vertical sync insert means 19 are known in the art.

Time expanded line differential signals 3 and 5 are modulated together in quadrature with one another by quadrature modulator means 20 onto a subcarrier fc1, 90. The modulated signal on this subcarrier will occupy about 1.76 MHz in total bandwidth.

Time expanded luminance components 8 and 9 are modulated in quadrature on a subcarrier fc3, 92 by quadrature modulator means 22. A bandwidth of more than 3.5 MHz is required because individually the luminance components, 8 and 9 have different bandwidths. In order to preserve the lower 1.75 MHz of both components, about 3.5 MHz of bandwidth is symmetrically located around subcarrier fc3. An additional asymmetrically located 1.75 MHz of bandwidth is needed however, to accommodate the higher frequency portion of luminance component 9, as enhanced by SSB enhancing filter 17.

Expanded chrominance components 6 and 7 are modulated in quadrature with each other on a subcarrier fc2, 91 by quadrature modulator means 21. A bandwidth of more than 1.32 MHz is required because individually chrominance components 6 and 7 have different bandwidths. In order to preserve the lower 0.88 MHz of both components, about 1.32 MHz of bandwidth is symmetrically located around subcarrier fc2. An additional asymmetrically located 0.44 MHz is needed however, to accommodate the high frequency portion of chrominance component 7, as enhanced by SSB enhancing filter 14.

It is to be noted that the double sideband signals must be preserved in order to demodulate any two signals modulated in quadrature. It is also to be noted that expansion ratios used in expander means 11, 12, 13, 15, 16 and 18 are all identical in order to have artifacts coherent to the picture in case of possible cross-talk between components.

Chrominance component 7 and luminance component 9 are processed by SSB enhancing filters 17 and 14 respectively. As shown in FIG. 5, SSB enhancing filter 17 can have a frequency response of magnitude 1, from about 0 to 9 MHz and a magnitude of 2 from about 9 to 16.8 MHz. This is required for enhancing the portions of luminance component 9 from about 9 to 16.8 MHz by a factor of 2. Unenhanced, the upper portion of luminance component 9 will have half of the magnitude as compared to lower portion due to the fact that lower frequency portion is supported by double sideband quadrature modulation while the upper portion is only single sideband modulated. Similarly as shown in FIG. 4 SSB enhancing filter 14 is used for chrominance component 7 and has a frequency response at magnitude 1 from about 0 to 2.1 MHz and at a magnitude 2 from about 2.1 to 4.2 MHz.

Bandpass filters 23, 24 and 25 are at the outputs of quadrature modulating means 20, 21 and 22 respectively and act to eliminate unnecessary sidebands on quadrature modulated subcarrier fc1, quadrature modulated subcarrier fc2 and quadrature modulated subcarrier fc3, which are referred to hereinafter as line frequency difference packet 26, chrominance frequency packet 28 and luminance frequency packet 40 respectively.

In addition to line difference frequency packet 26, chrominance frequency packet 28 and luminance frequency packet for sound.

Digital audio is provided as part of the HDMAC-60 input signal 31 and can be encoded for example by a Dolby Adaptive Delta Modulation (ADM) encoder 32, direct sequence encoder 33 and pseudo random sequence generator 34; QPSK modulated in encoder 35 onto a carrier fc4, 93 and filtered in bandpass filter 36 forming a digital sound frequency packet 40 which is for example 0.44 MHz wide. Bandpass filter 36 limits this frequency to 0.44 MHz bandwidth. If ADM is used the data stream is 480 kilobits per second. Additionally, 32 kilobits per second could be added for fine synchronization. The total bit rate for the digital sound packet 40 will amount to 440 kilobits per second.

The audio provided at 31 is also input to a standard FM modulator 37 and modulated onto a carrier fc5, 94 which passes through bandpass filter 38 thereby forming an analog sound frequency packet 41 which is 0.25 MHz wide and will have all of the features of a conventional NTSC sound signal like stereo, MTS and SAP.

Line difference frequency packet 26, chrominance frequency packet 28, luminance frequency packet 30, digital sound packet 40 and analog sound packet 41 emerging from bandpass filters 23, 24, 25, 36 and 38 respectively are added together in multiplexer means 42 forming a high definition multiple analog component AM signal (HDMAC-AM) 43, located in a certain frequency channel 8.58 MHz wide for example. Information for generating subcarriers fc1, fc2, fc3, fc4 and fc5 at the receiver, can be transmitted within, for example, the "burst" portion of the HDMAC-AM signal 82, shown in FIG. 6. This HDMAC-AM signal 43 can then be heterodyned up to an appropriate channel of, for example a cable TV system, by mixer 44 and band transmission means 46 known in the art.

FIG. 3 is a two-dimensional representation of the spectra of all of the frequency packets of the HDMAC-AM signal.

Depending on the capabilities of the receiver, either the complete HDMAC-AM signal as described in FIG. 3, carrying the full array of high definition features can be received, or only those parts of the signal corresponding to particular features desired by the user can be received. Selected portions of the HDMAC-AM signal can be processed to provide a received program with features corresponding to the chosen portion of the signal by for example detecting the subcarriers in the "burst" portion of the signal corresponding to the features desired and tuning just the desired portion of the total HDMAC-AM signal bandwidth, by means known in the art.

For example, a relatively inexpensive receiver could utilize a 6.13 MHz selection band to tune a portion of the 8.58 MHz of the HDMAC-AM signal in a way that would include 1.32 MHz of chrominance and about 4.1 MHz of luminance signal. This is labelled A in FIG. 3. The quality of the picture demodulated from this signal would have a horizontal resolution of 330 TV lines per picture height (TVL/ph) for luminance, 124 TVL/ph for chrominance and 525 lines 2:1 interlaced. This is equivalent by resolution numbers to an NTSC quality image with additional benefits, such as perfectly separable chrominance and luminance because their frequency bands do not interleave. The decoded signals would have a 16 to 9 aspect ratio and would permit displaying signals with NTSC resolution quality and a wide aspect ratio providing an inexpensive solution to showing widescreen movies. Analog sound or optimally digital sound could also be provided by equipping the receiver to detect the appropriate part of the HDMAC-AM signal.

A more expensive receiver for providing a better quality display, would locate the 6.1 MHz selection band to the left in such a way that only 0.88 MHz of chrominance, about 4.56 MHz of luminance is enclosed. 525 lines, 2:1 interlaced would then also be provided. This is labelled B in FIG. 3. The quality of the demodulated picture would be 400 TVL/ph for luminance horizontally and about 62 TVL/ph for chrominance horizontally which is equivalent to VHS-S (super VHS) quality. Again, additional benefits would be the 16:9 aspect ratio and digital sound.

A "deluxe" receiver could also be provided to tune the entire 8.58 MHz signal (labelled as C) which would provide the full high definition television signal encompassing digital sound, luminance of 500 TVL/ph, chrominance of 124 TVL/ph, and 525 lines non-interlaced as provided by the line difference packet 26.

FIG. 2 describes an embodiment for receiving and decoding the entire HDMAC-AM signal and for providing a display with all of the high definition features. The HDMAC-AM signal 46 is received through conventional receiving means, for example over a CATV channel, and is heterodyned down from that channel through conventional mixing means 52 and the bandpass filters 53, 54, 55, 56 and 57 which isolate the line difference frequency packet 26, the chrominance frequency packet 28, the luminance frequency packet 30, the digital sound frequency packet 40 and the analog sound frequency packet 41 respectively. Quadrature demodulator 58 demodulates difference frequency packet 26 into expanded LD2/LD4 line differential signals 3 and 5 which are compressed to their original form by compressor means 59 and 60 respectively. The compressor means can be the same type FIFO chips used in the expander means described above. Similarly, quadrature demodulator 62 demodulates chrominance frequency packet 28 into expanded U1S/V3L chrominance signals 6 and 7 which are compressed to their original form by compressor means 63 and 64 respectively, and quadrature demodulating means 65 demodulates luminance frequency packet 30 into expanded Y1S/Y3L luminance signals 8 and 9 which are compressed by compressor means 66 and 67 respectively. Line differential signals 3 and 5, chrominance signals 6 and 7 and luminance signals 8 and 9 together with sync signal 10 which is derived from the luminance signal 9 in vertical sync separator 69, are fed to HDMAC-60 decoder 68 which generates an RGB signal which is displayed on a compatible monitor.

The digital sound frequency packet 40 is decoded for example by QPSK decoder 70, direct sequence decoder 71, pseudo random sequence generator 72 and Dolby ADM decoder 73 in order to form a digital audio output signal 75 and finally a standard FM demodulator 76 is used to decode analog frequency packet 41 into audio output 77.

Receivers providing only selected features of the HDMAC-AM signal comprise means for processing only those portions of the HDMAC-AM signal which provide the desired features.

Table I gives a brief summary of the parameters used in the instant invention.

In order to multiplex the six HDMAC components, as described above, the HDMAC-AM encoder expands each component by the same ratio (for example 24/5) expanding 26 μsec. components into 124.8 μsec. components. This expansion creates a very long time base component. As a result "ghost image" artifacts are suppressed better with this system then with a standard NTSC signal. Reflections of the time expanded components on the "superline" are of the same duration as reflections for a standard NTSC time base. However, the HDMAC-AM components are receiver thereby creating equally compressed ghost images which are therefore closer to the main picture then those experienced during a standard NTSC transmission creating a smaller artifact. Sensitivity of human visual system to the near "ghost images" is much less than to the relatively far NTSC "ghost images".

FIG. 6 shows the "superline" time budget indicating room for a 2.3 microsecond "burst" 82. The time budget of the HDMAC-AM signal basically consists of two time multiplexed packets. For example, packet 80 is the frequency multiplex of the video components, 124.8 μsec. wide and packet 82 is a 2.3 μsec. "burst" component which can carry information used to generate carriers fc1, fc2, fc3, fc4 and fc5 at the receiver for demodulating the six HDMAC-60 video components and the digital audio. The information carried by the burst can also be carried during one line of the vertical interval and demodulated in a decoder by using a microprocessor.

Other embodiments of the invention can use longer "superlines" and multiplex expanded video components.

The foregoing disclosure and description of the invention is illustrative and explanatory thereof and various changes in line standards, frequencies, and construction of appropriate apparatus for practicing the invention may be made within the scope of the appended claims without departing from the spirit of the invention.

TABLE I

| Component; 16/9 aspect ratio | Original time base; bandwidth | Expansion ratio | HDMAC-60AM time base; bandwidth | |
|---|---|---|---|---|
| LD2 | 26 μs; 4.2 MHz | 24/5 | 124.8 μs; 0.88 MHz | modulated in quadrature on fc1 |
| LD4 | 26 μs; 4.2 MHz | 24/5 | 124.8 μs; 0.88 MHz | |
| U1s | 26 μm; 2.1 MHz | 24/5 | 124.8 μs; 0.44 MHz | modulated in quadrature on fc2 |
| V31 | 26 μs; 4.2 MHz | 24/5 | 124.8 μs; 0.88 MHz | |
| Y1s | 26 μs; 8.4 MHz | 24/5 | 124.8 μs; 1.75 MHz | modulated in quadrature on fc3 |
| Y31 | 26 μs; 16.8 MHz | 24/5 | 124.8 μs; 3.5 MHz | |
| Digital Sound | 440 kb/s | — | 127.11 μs; 0.44 MHz | modulated on fc4 |
| Analog Sound | 10 Hz–10 KHz | — | 127.11 μs; 0.25 MHz | modulated on fc5 |

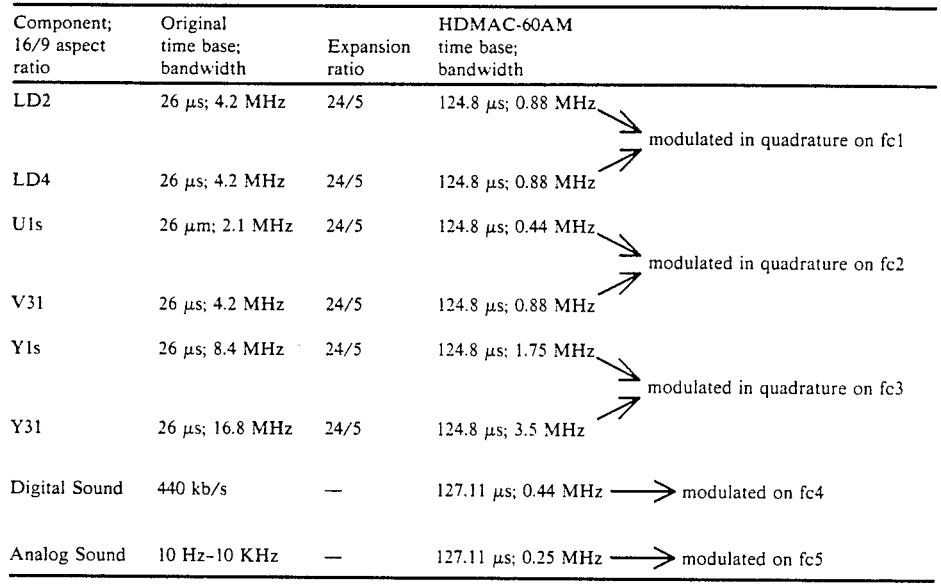

I claim:

1. A method for forming a frequency multiplexed television signal, comprising the steps of:
   (a) deriving from a first television signal, a pair of luminance signals, a pair of chrominance signals and a pair of line differential signals;
   (b) time expanding each of said luminance, line differential and chrominance signals so as to form a plurality of signal components;
   (d) quadrature modulating a first pair of said signal components on a first subcarrier forming a first frequency packet;
   (e) quadrature modulating a second pair of said signal components on a second subcarrier forming a second frequency packet;
   quadrature modulating a third pair of said signal components on a third subcarrier forming a third frequency packet; and
   (f) combining said first, second and third frequency packets to generate said frequency multiplexed signal.

2. The method of claim 1 wherein said first, second and third frequency packets are frequency multiplexed with at least one audio frequency packet to generate said frequency multiplexed signal.

3. The method of claim 2 wherein a first audio frequency packet is formed by digitally modulating an audio signal on a fourth subcarrier and a second audio frequency packet is formed by frequency modulating said audio signal on a fifth subcarrier.

4. The method of claim 1 wherein said first pair of signal components comprise said luminance signals, said second pair of signal components comprise said chrominance signals and said third pair of signal components comprise said line differential signals.

5. A method for providing a television display from the frequency multiplexed signal of claim 1, said method comprising the steps of:
   (a) deriving from said frequency multiplexed signal said first, second and third frequency packets;
   (b) demodulating said first frequency packet to form said first pair of signal components;
   (c) demodulating said second frequency packet to form said second pair of signal components;
   (d) demodulating said third frequency packet to form said third pair of signal components;
   (e) compressing said signal components in time and forming therefrom a pair of luminance signals, a pair of chrominance signals, and a pair of line differential signals; and
   (f) combining said luminance, chrominance and line differential signals so as to form said television display.

6. The method of claim 5 wherein said frequency multiplexed signal comprises and audio signal, said method further comprising the step of demodulating said audio signal.

7. Method for providing a television display from the frequency multiplexed signal of claim 1, said method comprising the steps of:
   (a) deriving from said frequency multiplexed signal, selected ones of said frequency packets; and
   (b) demodulating said derived frequency packets so as to form said television display.

8. Apparatus for forming a frequency multiplexed television signal, comprising in combination:
   (a) means for deriving from a first television signal, a pair of luminance signals, a pair of chrominance signals, and a pair of line differential signals;
   (b) means for time expanding each of said luminance, chrominance and line differential signals;
   (c) means for quadrature modulating said time expanded line differential signals on a first subcarrier forming a first frequency packet;
   (d) means for quadrature modulating said time expanded chrominance signals on a second subcarrier forming a second frequency packet;
   (e) means for quadrature modulating said time expanded luminance signals on a third subcarrier forming a third frequency packet; and
   (f) means for combining said first, second, and third, frequency packets and at least one audio frequency packet to generate said frequency multiplexed signal.

9. A method for transmitting a frequency multiplexed television signal over a communications channel, comprising the steps of:
   (a) deriving from a first television signal, a pair of luminance signals, a pair of chrominance signals, and a pair of line differential signals;
   (b) time expanding each of said luminance, chrominance and line differential signals;
   (c) quadrature modulating said time expanded line differential signals with each other on a first subcarrier forming a first frequency packet;
   (d) quadrature modulating said time expanded chrominance signals with each other on a second subcarrier forming a second frequency packet;
   (e) quadrature modulating said time expanded luminance signals with each other on a third subcarrier forming a third frequency packet;
   (f) combining said first, second, and third frequency packets to generate a frequency multiplexed packet; and
   (g) locating said frequency multiplexed packet in said communications channel.

10. The method of claim 9 wherein said communications channel is about 8.6 MHZ. wide and has a line period of about 127.11 $\mu$sec.

11. The method of claim 9 wherein said first, second and third frequency packets are frequency multiplexed with at least one audio frequency packet to generate said frequency multiplexed packet.

12. The method of claim 11 wherein a first audio frequency packet is formed by digitally modulating an audio signal on a fourth subcarrier and a second audio frequency packet is formed by frequency modulating said audio signal on a fifth subcarrier.

13. Apparatus for transmitting a frequency multiplexed television signal over a communications channel, comprising in combination:
   a) means for deriving from a first television signal, a pair of luminance signals, a pair of chrominance signals, and a pair of line differential signals;
   b) means for time expanding each of said luminance, chrominance and line differential signals;
   (c) means for quadrature modulating said time expanded line differential signals on a first subcarrier forming a first frequency packet;
   (d) means for quadrature modulating said time expanded chrominance signals on a second subcarrier forming a second frequency packet;
   (e) means for quadrature modulating said time expanded luminance signals on a third subcarrier forming a third frequency packet;
   (f) means for combining said first, second, and third, frequency packets and at least one audio frequency packet to generate a frequency multiplexed packet; and
   (g) means for transmitting said frequency multiplexed packet on said communications channel.

14. Apparatus for forming a frequency multiplexed television signal, comprising in combination:
   (a) means for deriving from a first television signal, a pair of luminance signals, a pair of chrominance signals, and a pair of line differential signals;
   (b) means for time expanding each of said luminance, chrominance and line differential signals so as to form a plurality of signal components;
   (c) means for quadrature modulating a first pair of said signal components on a first subcarrier forming a first frequency packet;
   (d) means for quadrature modulating a second pair of said signal components on a second subcarrier forming a second frequency packet;
   (e) means for quadrature modulating a third pair of said signal components on a third subcarrier forming a third frequency packet; and
   (f) means for combining said first, second and third frequency packets to form said frequency multiplexed signal.

15. Apparatus for providing a television display from the frequency multiplexed signal of claim 14, comprising or in combination:

(a) means for deriving from said frequency multiplexed signal said first, second and third frequency packets;
(b) means for demodulating said first frequency packet to form said first pair of signal components;
(c) means for demodulating said second frequency packet to form said second pair of signal components;
(d) means for demodulating said third frequency packet to form said third pair of signal components;
(e) means for compressing said signal components in time and forming therefrom a pair of luminance signals, a pair of chrominance signals, and a pair of line differential signals; and
(f) means for combining said luminance, chrominance and line differential signals so as to form said television display.

16. Apparatus for providing a television display from the frequency multiplexed signal of claim 14, comprising in combination:
(a) means for deriving from said frequency multiplexed signal selected ones of said frequency packets; and
(b) means for demodulating said derived frequency packets so as to form said television display.

* * * * *